United States Patent [19]
Thomas

[11] Patent Number: 5,415,432
[45] Date of Patent: May 16, 1995

[54] D-RING FOR SEAT BELT

[75] Inventor: Rudy V. Thomas, Sterling Heights, Mich.

[73] Assignee: AlliedSignal Inc., Morristown, N.J.

[21] Appl. No.: 99,981

[22] Filed: Jul. 30, 1993

[51] Int. Cl.⁶ .............................................. B60R 22/24
[52] U.S. Cl. ................................... 280/808; 297/483
[58] Field of Search ............... 280/808, 801 R, 801.1; 297/483, 486, 468; 242/107

[56] References Cited

U.S. PATENT DOCUMENTS

| | | | |
|---|---|---|---|
| 3,298,739 | 1/1967 | Scruggs | 280/808 |
| 4,005,904 | 2/1977 | Weman et al. | 297/483 |
| 4,101,171 | 7/1978 | Sasaki et al. | 297/483 |
| 4,191,400 | 3/1980 | Smith | 280/808 |
| 4,349,217 | 9/1982 | Fohl | 280/808 |
| 4,389,059 | 6/1983 | Stephenson | 280/808 |
| 4,444,432 | 4/1984 | Kikuchi | 280/808 |
| 4,480,853 | 11/1984 | Ando et al. | 280/808 |
| 4,642,853 | 2/1987 | Plesniarski | 280/808 |
| 4,789,186 | 12/1988 | Andersson | 280/808 |

FOREIGN PATENT DOCUMENTS

| | | | |
|---|---|---|---|
| 2817741 | 10/1979 | Germany | 297/483 |
| 1531415 | 11/1978 | United Kingdom | 280/808 |
| 2174888 | 11/1986 | United Kingdom | 280/808 |
| 1111907 | 9/1984 | U.S.S.R. | 280/808 |

Primary Examiner—Margaret A. Focarino
Assistant Examiner—Peter C. English
Attorney, Agent, or Firm—Markell Seitzman

[57] ABSTRACT

A D-ring or seat belt apparatus (200) for safety belts comprising: a cradle (300) adapted to be mounted to a cooperating structure; a member (201, 204) supported by the cradle and having a roller (260) and flexible shaft (270) for supporting a shoulder belt portion of a seat belt. The member (201, 204) permitted to move or rotate side to side relative to the cradle, to move or rotate about a first axis of the cradle and to move or rotate about a second axis generally perpendicular to the first axis.

8 Claims, 2 Drawing Sheets

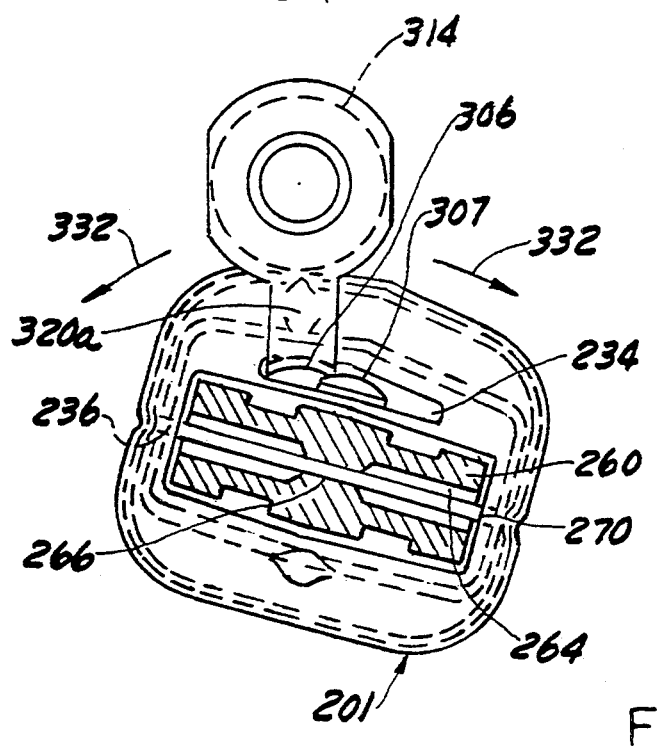
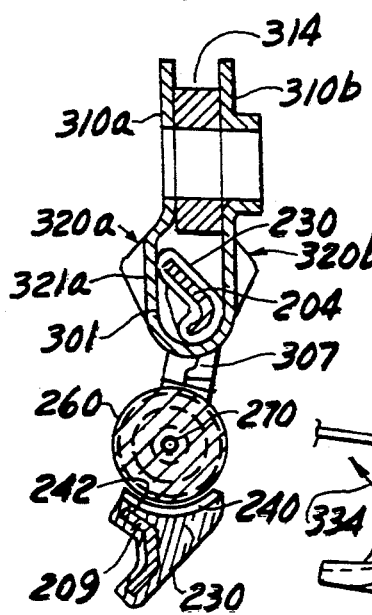
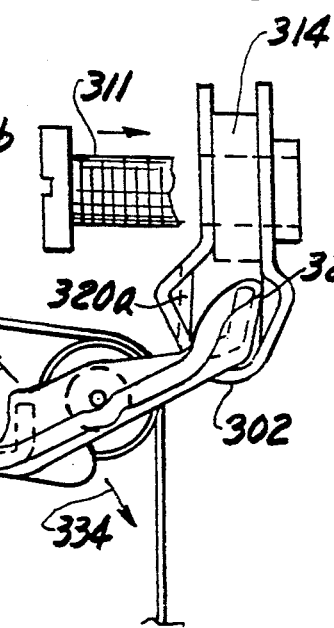
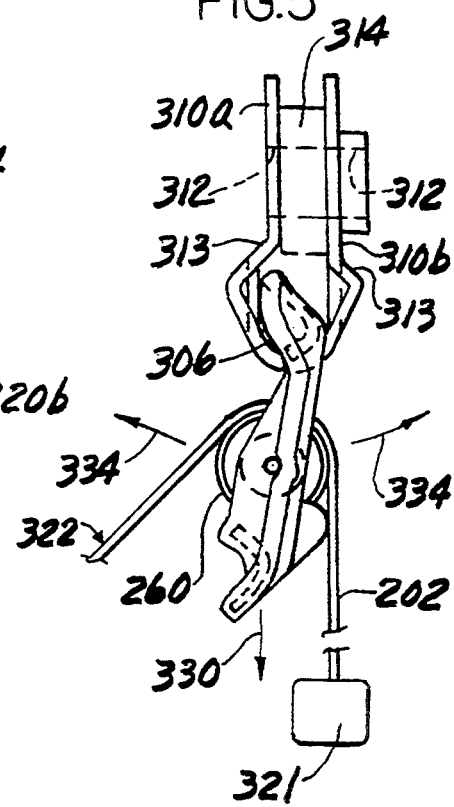

D-RING FOR SEAT BELT

BACKGROUND AND SUMMARY OF THE INVENTION

The present invention relates to a seat belt system and more particularly to an improvement in a D-ring for supporting the shoulder belt portion of a safety belt.

A typical seat belt system comprises a retractor upon which seat belt webbing is wound. The seat belt webbing extends from the retractor and is slidable received upon or over a D-ring which is typically attached to the B-pillar of a vehicle by a fastener. The fastener provides a single pivot axis about which the D-ring can rotate. As can be appreciated, as the safety belt slides over a cross or support member of the D-ring, friction forces are generated which requires amongst other things, that the retractor rewind spring be strong enough to overcome this friction. Various attempts have been made to provide a D-ring with the necessary load bearing capacity which is also characterized by a low level of webbing retarding frictional force. U.S. Pat. Nos. 4,389,059 and 4,349,217 are illustrative of D-rings which comprise a roller mechanism for reducing frictional retarding forces. Occasionally, as the D-ring is pulled or rotated about the fastener by the webbing the webbing may slide laterally over and bunch up within a corner of a slot in the D-ring. This slot is typically located just above the cross or support member. This bunching makes it more difficult or impossible to retract the webbing due to increased friction forces until, of course, the webbing is again laid flat on the support member.

It is the object of the present invention to provide a D-ring characterized by a low frictional retarding force and one that is less susceptible to web bunching and one which has a number of degrees of freedom of motion.

Accordingly, the invention comprises: a D-ring or seat belt apparatus for safety belts comprising: a cradle adapted to be mounted to a cooperating structure; a member supported by the cradle and having first means for supporting a shoulder belt portion of a seat belt, the cradle and member including second means for permitting the member to move or rotate side to side relative to the cradle, to move or rotate about a first axis of the cradle and to move or rotate about a second axis generally perpendicular to the first axis. The first means includes a roller and flexible shaft which are rotated by the safety belt. The member is encased in plastic, wherein the plastic provides bearing or bushing surfaces to rotationally support the shaft.

Many other objects and purposes of the invention will be clear from the following detailed description of the drawings.

BRIEF DESCRIPTION OF THE DRAWINGS

In the drawings:

FIG. 4 illustrates a side cross-sectional view of a D-ring.

FIG. 5 is a side plan view of a D-ring.

FIG. 6 shows the D-ring in an exaggerated position relative to a cradle.

FIG. 7 is a plan view showing a D-ring rotated relative to a cradle.

DETAILED DESCRIPTION OF THE DRAWINGS

Figure 1:
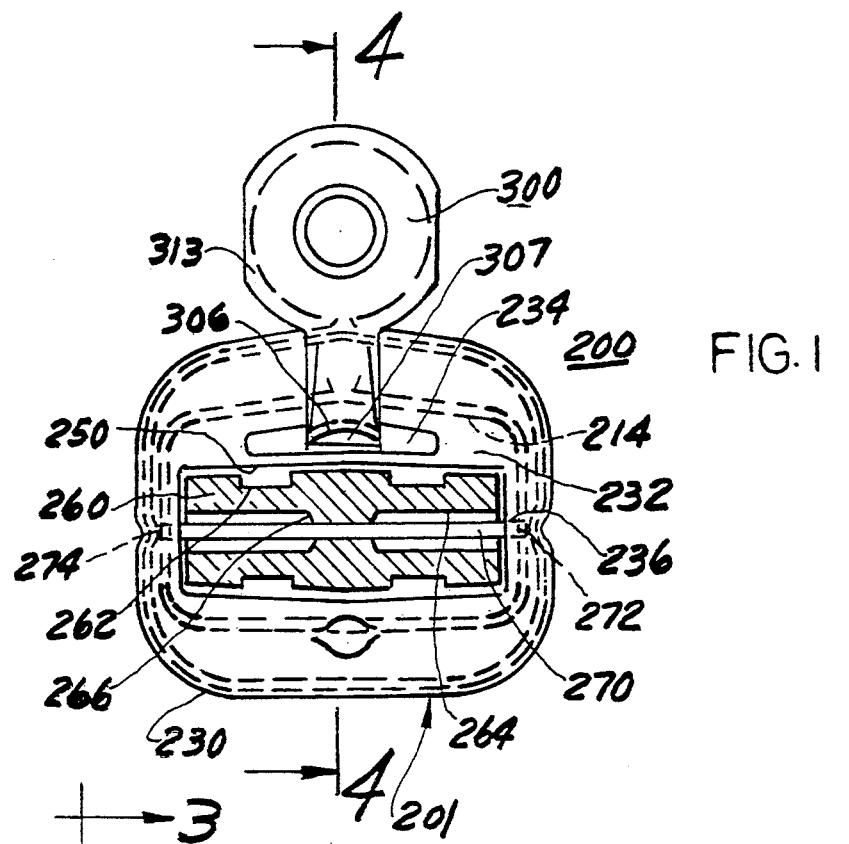
FIG. 1 is a plan view of a D-ring incorporating the present invention.
Figure 2:
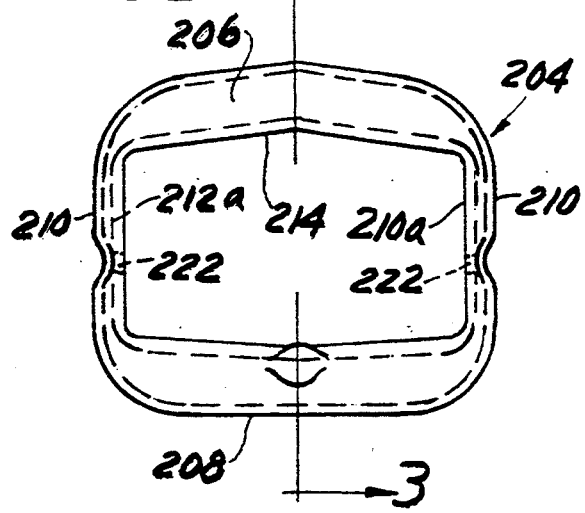
FIG. 2 illustrates a plan view of a plate.
Figure 3:
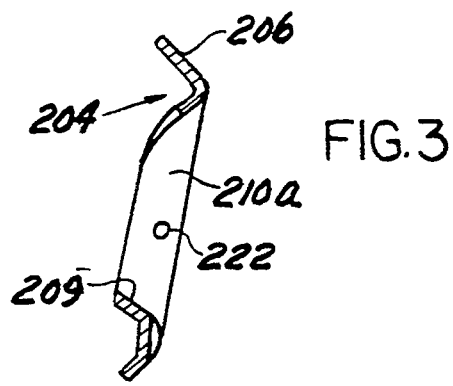
FIG. 3 shows a partial cross-sectional view of a stamped plate.

Reference is made to FIG. 1 which illustrates a D-ring 200 for supporting a shoulder belt 202 portion of a safety belt. The shoulder belt 202 is shown in FIG. 5. As will be seen, the D-ring 200 is characterized as having a number of degrees of freedom of motion. The D-ring 200 includes a plastic coated frame 201 comprising a metal support plate 204. Before fabrication, the metal plate 204 resembles a flat picture frame. The plate comprises a top 206, bottom 208 and sides 210 and 212 and an opening 214. Subsequently, the flat frame 204 is stamped such that the center of the top, bottom and sides is generally raised or bowed with those portions of the top, bottom and sides on either side of the center bent downwardly. This construction increases the load bearing capacity of the plate 204. A cross-sectional view of the stamped plate 204 is shown in FIG. 3. After the plate 204 is stamped, the downwardly extending, inner portion 210a and 212a of sides 210 and 212 are each provided with an opening 222. Thereafter, the stamped plate 204 is encased with a plastic sheath 230, discussed in greater detail below forming the plastic coated frame 201.

As can be seen from the cross-sectional view shown in FIG. 4, the thickness of the sheath 230 near the ends of the stamped plate 204 is relatively thin. As can also be seen in FIG. 4, the sheathing 230 which covers the top side or flange 209 of the bottom 208 of the plate 204 has an increased thickness. The sheath, at this location is formed as a cylindrically shaped pocket 242. As shown in FIG. 1 a central part 232 of the sheath 230 fills the opening 214 of the stamped plate 204. This portion 232 of the sheath 230 is also fabricated with an oblong slot 234, the purpose of which will be seen below. When the sheath 230 is molded about the plate 204, a plurality of pins, associated with the molding machine, are inserted within each opening 222 in the sides 210a and 212a. The sheath 230 material at 236 fills the space between the pins and openings 222. This material 236 provides a bearing or bushing surface for an associated shaft. Alternatively, separate bushings could be inserted in the openings 222.

The central part 232 of the sheath 230 defines a rectangular opening 250. Positioned within the opening 250, is a cylindrically shaped roller 260 which may include a plurality of annular grooves 262 (see FIG. 1). Positioned within a central bore 264 of the roller 260 is an inwardly directed annular boss 266. The roller 260 is supported relative to the support plate 204 by a thin flexible shaft 270 that is pressed fit against boss 266. The ends 272 and 274 of the shaft 270 are received within opposite bushings 236.

The annular grooves 262 on the roller 260 provide a means for preventing the webbing from sliding laterally across the roller 260 and from bunching up on one or the other end of the roller in response to a skewed webbing force. As can be appreciated, when the webbing is stressed such as during a crash situation, the downward forces acting upon the webbing will slightly deform the relatively soft webbing, urging a portion of the webbing, just above each groove 262, within one or both of the annular grooves 262. The interplay between the deformed webbing and the grooves 262 prevents the webbing from sliding to the left or to the right over the roller.

As can be seen from the various FIGURES the encased or sheathed support frame 201 is supported by a cradle 300. As can be seen in FIGS. 4 through 6, the cradle 300 is generally U-shaped and forms a pocket 301, at its lower end, to support the frame 201. As can be seen in FIGS. 1, and 4 through 7, the cradle 300 extends through opening 234. The bottom 302 of the cradle is coined, bent or curved upwardly at 306 to increase cradle strength, and to reduce the contact area with the top surface of opening 234 as well as to reduce sliding friction with the sheath center portion 232 and to provide a fulcrum about which the frame 201 can move. Additionally the sheath 230 on the frame 201 includes an L or U-shaped, flexible boss 307 which extends into the opening 234 and which slidingly contacts the underside of the bottom 302 of the cradle 300. The boss 307 is preferably circularly shaped, as is the bottom 302, and as can be seen in FIGS. 1 and 7 provides a means for capturing the bottom 302 between itself and the lower surface of the opening 234. In this way the frame's motion is somewhat restricted and rattling is prevented. The cradle 300 additionally includes extending side walls 310a and 310b. Each side wall includes an opening 312 through which a fastener 311 can be inserted. A spacer 314 is provided between the side walls and the fastener also extends through the spacer 314. The fastener 311 may be attached to a cooperating structure such as the B-pillar (not shown) of a motor vehicle. As can be seen from FIG. 7 the spacer 314 also operates as a motion stop limiting the motion of the frame 201. Each side wall 310a and 310b extends outwardly at 313 and is bent or dimpled generally in its center at 320a and 320b to increase its strength. The oppositely positioned bends or dimples provide fulcrums 321a and 321b about which the frame 201 can rotate (see FIGS. 8 and 9) and the angled surface of the dimples also provides additional space which permits a greater range of rotational motion for the frame 201 relative to the cradle.

In operation, that is when an occupant of the vehicle moves within the passenger compartment, the shoulder belt will normally be extended and retracted by an associated seat belt retractor 321. As the shoulder belt moves it causes the roller 260 and shaft 270 to rotate within the bearings or bushings 236. As can be appreciated since the shoulder belt does not slide across the roller 260 but causes the roller to rotate, the frictional forces generated are reduced. The use of a small diameter shaft further reduces the frictional forces generated. The obvious benefit of this is that the spring constant of any return or rewind spring in a cooperating retractor 321 can have be reduced. The benefit of using a reduced spring constant is that the restraint forces imparted by the seat belt on the occupant's shoulder are also lowered making the shoulder belt more comfortable.

When the vehicle is briskly decelerated such as when the brakes are forcefully applied, and if the retractor locks-up, a downward pulling force, generally shown as 330, is created as the occupant tends to move relative to the D-ring. The downward force of the webbing on the roller 260 might cause the flexible shaft to bend slightly. However, during a very high deceleration situation such as a crash, the shaft 270 will bend sufficiently so that the roller 260 moves and rests upon the sheath 230 at or on the cylindrically shaped pocket 242. The use of the cylindrically shaped pocket 242 more evenly distributes the forces imparted by the roller on the sheath. As can be appreciated, the thin flexible shaft 270, is not typically sized to resist or absorb the webbing forces, as is characteristic of the prior art. In the present invention the shaft is designed to bend and is chosen to have a reduced diameter to reduce frictional forces in its corresponding bearings 236. When the roller impacts the sheath such as during a severe deceleration of the vehicle, the reaction forces are absorbed by the flange 209 formed on the bottom 208 of the metal plate 204 of the D-ring 200. As can be seen from FIG. 5 the resultant force vector 330 resulting from the belt forces will generally be in the direction as shown. The deflection of the roller will generally follow this vector. While it is difficult to predict the exact direction of this vector, the curved pocket 242 of the sheath is extended upwardly sufficiently to provide a block to stop the roller's deflection over its expected range of motion.

Figure 8:
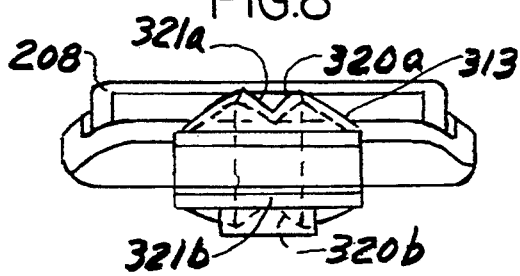
FIGS. 8 and 9 are top views showing a D-ring relative to a cradle.
Figure 9:
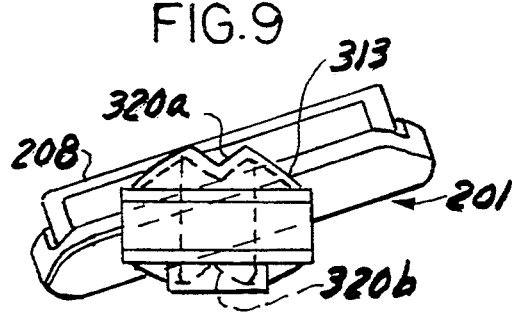

Further as can be seen from the above, the present invention provides a first degree of freedom for the D-ring 200 where the cradle can rotate about the fastener 311. A second degree of freedom is obtained by virtue of the permitted movement side to side motion or rotation of the cradle 300 and the frame 201, see arrows 332 of FIG. 7. A third degree of freedom is provided since the frame 201 is permitted to swing relative to the bottom of the cradle, see arrows 334 as is shown in FIGS. 5 and 6. The fourth degree of freedom is provided as the frame 201 is permitted to twist about a vertical axis of the cradle, as shown in FIGS. 8 and 9. It should be appreciated from the above that the multi-degree of freedom features can be incorporated into a D-ring that does not include a roller and flexing shaft. Of course, their use reduces friction in the seat belt system. However, in many applications the benefits derived from only the multi-degrees of freedom of the D-ring may be satisfactory.

Many changes and modifications in the above described embodiment of the invention can, of course, be carried out without departing from the scope thereof. Accordingly, that scope is intended to be limited only by the scope of the appended claims.

I claim:

1. A seat belt apparatus for safety belts comprising:
 a cradle adapted to be mounted to a cooperating structure;
 a member supported by the cradle and having first means for supporting a shoulder belt portion of a seat belt, the cradle and member including second means for permitting the member to move side to side relative to the cradle, to move about a first axis of the cradle and to move about a second axis generally perpendicular to the first axis; wherein the member includes a top and sidewalls extending therefrom defining an opening; and wherein the first means includes a roller rotationally supported at the sidewalls and includes a flexible shaft supporting the roller and rotatable therewith, and bearing means for providing a smooth bearing surface, located in the sidewalls for receiving respective ends of the shaft permitting the shaft to rotate; wherein the roller includes a bore for receiving the shaft, the bore being shaped at respective ends thereof to provide a space to accommodate the shaft as the shaft flexes in response to forces imparted to the roller by the safety belt webbing, the shaft being press fit to the roller proximate the center of the bore.

2. The apparatus as defined in claim 1 wherein the member includes a bottom (208) situated below the roller providing a mechanical stop to limit flexing of the shaft and hence movement of the roller when stressed by the safety belt.

3. The apparatus as defined in claim 2 wherein a surface (242) of the bottom facing the roller is shaped conformably to the roller.

4. The apparatus as defined in claim 3 wherein the diameter of the shaft is substantially smaller than the diameter of the roller.

5. A seat belt apparatus for safety belts comprising:
a cradle adapted to be mounted to a cooperating structure;
a member supported by the cradle and having first means for supporting a shoulder belt portion of a seat belt, the cradle and member including second means for permitting the member to move side to side relative to the cradle, to move about a first axis of the cradle and to move about a second axis generally perpendicular to the first axis;
wherein the member includes a top and sidewalls extending therefrom defining an opening;
and wherein the first means includes a roller rotationally supported at the sidewalls and includes a flexible shaft supporting the roller and rotatable therewith, and bearing means for providing a smooth bearing surface, located in the sidewalls for receiving respective ends of the shaft permitting the shaft to rotate;
wherein the member is encased in a plastic material and wherein the bearing means is provided by a portion of the encasing material.

6. The apparatus as defined in claim 5 wherein the encasing material fills part of the opening (214) in the member and reduces the opening to a smaller size and wherein a bottom of the cradle engages a top of the smaller sized opening.

7. The apparatus as defined in claim 6 wherein the encasing material defines a boss (307) extending into the smaller sized opening and wherein the boss provides a surface which contacts the bottom of the cradle.

8. A seat belt apparatus (200) for safety belts comprising:
a cradle (300) adapted to be mounted to a cooperating structure;
a cradle (201, 204) supported by the cradle and having first means (260, 270) for supporting a shoulder belt portion (202) of a seat belt, the cradle and member including second means (234, 302, 313) for permitting the member to move side to side relative to the cradle and to move about a first axis of the cradle and to move about a second axis generally perpendicular to the first axis, wherein the first means includes a roller (260) and a flexible shaft (270) supporting the roller, the shaft rotationally supported on the meter, the shaft flexing in response to seat belt forces imparted to the roller, wherein the roller includes a bore (270) for receiving the shaft, the bore being shaped at respective ends thereof to provide a space to accommodate the shaft as the shaft flexes in response to forces imparted to the roller by the safety belt, the shaft being press fit to the roller proximate the center of the bore.

* * * * *